UNITED STATES PATENT OFFICE.

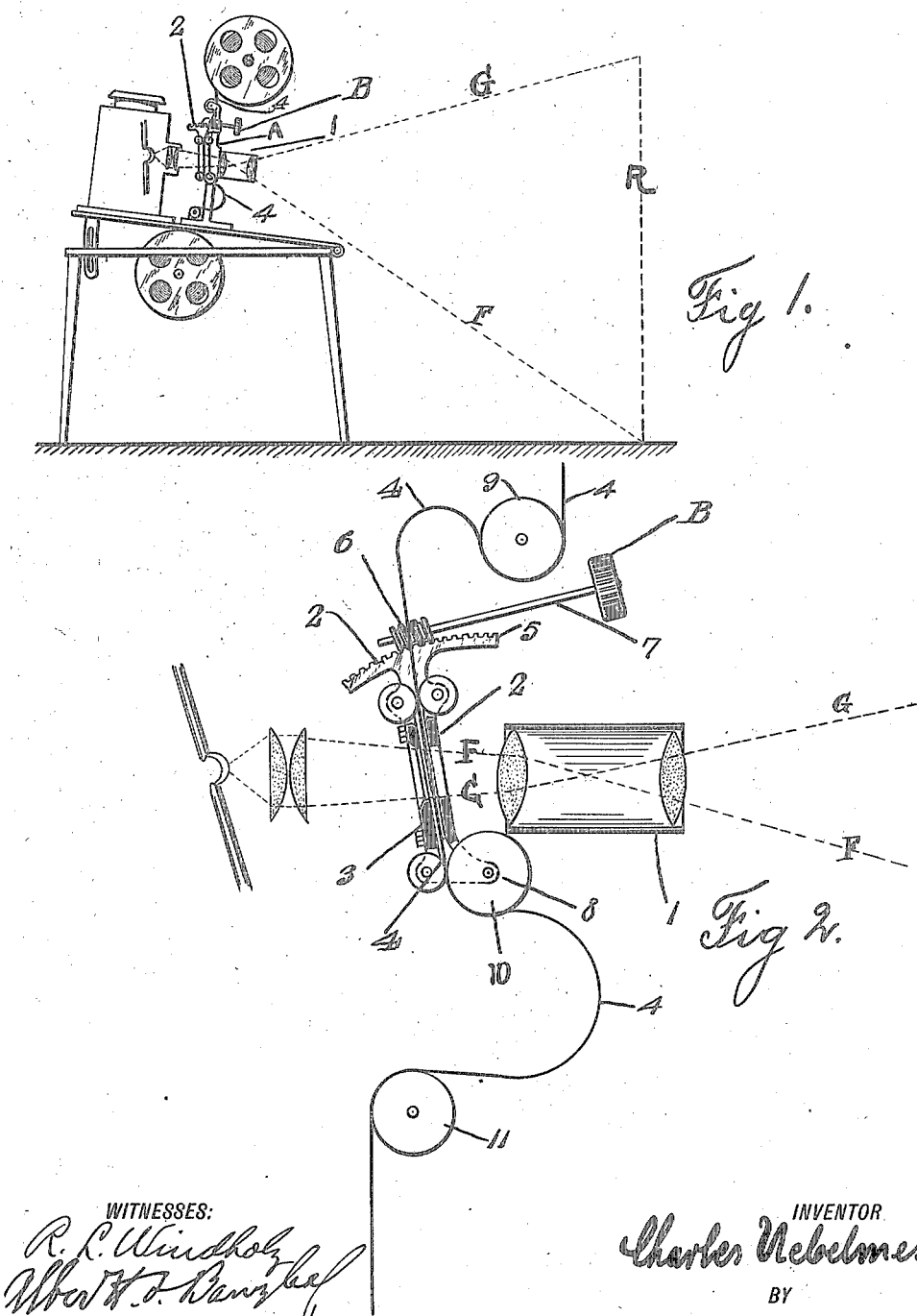

CHARLES UEBELMESSER, OF NEW YORK, N. Y., ASSIGNOR TO CRU PATENTS CORPORATION, A CORPORATION OF NEW YORK.

FOCUS-RECTIFIER.

1,291,274.           Specification of Letters Patent.       Patented Jan. 14, 1919.

Application filed March 11, 1915. Serial No. 13,815.

*To all whom it may concern:*

Be it known that I, CHARLES UEBELMESSER, a subject of the Emperor of Germany, residing at New York city, in the county and State of New York, have invented certain new and useful Improvements in Focus-Rectifiers, of which the following is a clear, full, and exact description.

This invention relates to a focusing device for a projecting apparatus or camera where a picture is to be taken or where a picture is to be projected by means of an objective and especially where a screen, to receive the projected picture, is not parallel with the projecting lens, or where the plane of view is not parallel with the camera lens.

Heretofore it has been impossible to obtain a perfect focus in a projected picture where the projection apparatus was stationed at a point not parallel with the screen, as it is the case in most theaters where the projecting apparatus is located in the upper balconies of a theater, throwing the picture downward on the screen or sidewise, and the picture then appears more or less distorted as it is only partially in the focal plane and no device has been heretofore able to rectify this focal distortion.

My device is a most simple arrangement which will work equally well and in the same manner in projecting machines and cameras. In the annexed description, I illustrate the manner in which my invention is carried out, particularly in a projecting machine for motion pictures, but in nowise is the device limited to this apparatus, but can be used as well in stereopticon machines and cameras.

In carrying out my invention, I provide a guide, an aperture plate carrying a film, a guide door on said aperture, and a plate to hold said film properly in the aperture. This film carrying means is pivotally secured near a lens in the path of light. On this guide I provide arrangements to allow this guide plate to be tilted so that the length of the light rays become unequal behind said lens in proportion to the variation in front of the lens between said lens and the screen to receive the picture. In consequence thereof the focal plane is moved and the distortion rectified. This arrangement can be used in the present projecting apparatus in place of its regular aperture plates and adjoining guides.

The scope of my invention will be pointed out in the claims.

In the accompanying drawings,

Figure 1 is a side elevation of the usual motion picture projecting machine in operation at a slight angle with relation to the screen.

Fig. 2 is a side view of my invention as used in motion picture projecting machines like that shown in Fig. 1.

As shown in the drawings of Fig. 1, a lens objective, which is carried by the projecting machine in the path of light with the aperture 2 carrying guide door 3. The aperture guide is provided in its upper portion with gear teeth 5; said gear teeth are engaged by worm 6. Said worm 6 is fastened on adjustment shaft 7. On said shaft 7 is also fastened a round grip handle B. Shaft 7 with handle B is mounted in the frame A of a kinetoscope. Upon turning handle B around its axis shaft 7 and worm 6 are turned and engage the aperture plate 2 on rack-teeth 5, tilting the aperture guide back or forth as may be desired. Guide plate aperture 2 is pivotally mounted on shaft 8. Picture film 4 is delivered by the usual delivery roll 9 to aperture 2, over feed roller 10 and over another feed roller 11, into a receptacle or receiving reel. The handle B may be operated to move the aperture plate back or forth until the distortion in the projection is rectified while the machine is in operation.

Through shifting the aperture plate backward the light rays F in Fig. 2 become longer between the back of the lens 1, corresponding with light rays F between the lens 1 and screen R, which are also longer than the light rays G in Fig. 1. Thus the distortion in a focal plane is rectified in simple manner.

I can provide an additional sideway shift similar to the vertical shift, as is necessary for instance where the machine or lens is out of the center of the line of the screen R. I do not illustrate this side shift in my drawing as it is accomplished in similar manner.

What I claim as my invention is:

1. In a projecting apparatus, the combination with a fixed lens and a film guide of means for adjusting the position of the film guide angularly relative to the fixed lens.

2. In a projecting apparatus, the combination with a fixed lens and a pivotally mounted film guide of means for pivotally adjusting said film guide to vary the angular relation between said film guide and said fixed lens.

3. The combination with a fixed lens of a film guide pivotally secured at one end to a fixed point of means for moving the free end of said film guide toward or away from said fixed lens.

4. The combination with a fixed lens of a film guide pivotally mounted at one end at a point fixed relative to said lens and provided with a rack at its other end, a worm meshing with said rack to control the movement thereof and means for controlling said worm.

5. Means for rectifying the optical distortion in projected picture photography comprising a film guide angularly displaceable relative to a fixed lens and means for varying the degree of angular displacement of said guide relative to said fixed lens.

Signed at the city of New York this 4th day of March, one thousand nine hundred and fifteen.

CHARLES UEBELMESSER.

Witnesses:
R. L. WINDHOLZ,
ALBERT F. BANSHOF.